United States Patent
Pauls et al.

(10) Patent No.: US 6,713,156 B1
(45) Date of Patent: Mar. 30, 2004

(54) POLYMER-TREATED ABRASIVE SUBSTRATE

(75) Inventors: Steven Pauls, Old Bridge, NJ (US); Rajeev Farwaha, Belle Mead, NJ (US); Christopher Barcomb, Somerset, NJ (US)

(73) Assignee: National Starch and Chemical Investment Holding Corporation, New Castle, DE (US)

( * ) Notice: Subject to any disclaimer, the term of this patent is extended or adjusted under 35 U.S.C. 154(b) by 0 days.

(21) Appl. No.: 10/429,818

(22) Filed: May 5, 2003

(51) Int. Cl.⁷ .................................................. B32B 5/00
(52) U.S. Cl. ...................... 428/141; 428/152; 428/155; 428/156; 427/372.2; 427/384
(58) Field of Search ................................ 428/152, 155, 428/141, 156; 427/372.2, 384

(56) References Cited

U.S. PATENT DOCUMENTS

| | | | |
|---|---|---|---|
| 4,659,609 A | 4/1987 | Lamers et al. | 428/194 |
| 5,508,102 A | 4/1996 | Georger et al. | 428/297 |
| 5,560,794 A | 10/1996 | Currie et al. | 156/73.2 |
| 5,585,415 A * | 12/1996 | Gorzalski et al. | 522/18 |
| 5,712,210 A | 1/1998 | Windisch et al. | 442/320 |
| 5,786,065 A | 7/1998 | Annis et al. | 428/141 |
| 6,140,388 A | 10/2000 | Nass et al. | 523/139 |
| 6,352,567 B1 | 3/2002 | Windisch et al. | 51/298 |
| 6,426,034 B1 * | 7/2002 | McComas et al. | 264/494 |
| 2002/0013984 A1 | 2/2002 | Makiyama et al. | 28/103 |
| 2002/0146956 A1 | 10/2002 | Ngai | 442/381 |
| 2003/0180558 A1 * | 9/2003 | MacQueen et al. | 428/474.4 |

* cited by examiner

Primary Examiner—D. Lawrence Tarazano
(74) Attorney, Agent, or Firm—Thomas F. Roland; Charles W. Almer

(57) ABSTRACT

The present invention is directed to an abrasive substrate formed by the application of a polymer composition to the surface of the substrate. The polymer composition is applied to the substrate in a manner producing an uneven, structured coating on the substrate, resulting in a surface having abrasive properties. The invention is especially useful in producing abrasive non-woven materials useful as wet and dry wipes.

14 Claims, No Drawings

POLYMER-TREATED ABRASIVE SUBSTRATE

FIELD OF THE INVENTION

The present invention relates to an abrasive substrate formed by the application of a polymer composition to the surface of the substrate. The polymer composition is applied to the substrate in a manner producing an uneven, structured coating on the substrate, resulting in a surface having abrasive properties. The invention is especially useful in producing abrasive non-woven materials useful as wet and dry wipes.

BACKGROUND OF THE INVENTION

Abrasive substrates, and especially nonwovens and papers are widely used in wipes for make-up removal, personal cleansing, household cleaning, and industrial scrubbing. Conventional abrasive articles typically consist of a layer of abrasive particles bonded to a substrate. The particles are often bound to the substrate using a polymeric binder.

U.S. application No. 2002/0026752 describes such an abrasive article having precisely shaped particles. U.S. Pat. No. 6,352,567 also describes an air-laid non-woven held together with a phenolic resin and having ceramic aluminum oxide and alumina particles coated onto the surface to add abrasion. U.S. Pat. No. 6,140,388 describes an abrasive non-woven using a cross-linking polymer binder to bind abrasive grains to the non-woven material.

Abrasive non-woven articles have been formed without added abrasive materials. U.S. Pat. No. 4,659,609 discloses a melt-blown process, in which polymeric fibers 25 have their ends exposed to the surface, creating an abrasive surface. These multi-layer composite materials employ a spun-bonded supporting layer carrying an outer layer of melt-blown abrasive fibers, thermally bonded to the supporting web. The disadvantages of non-uniform distribution of the abrasive fibers was improved upon in U.S. Pat. No. 5,786,065 by forming a nonabrasive web of thermoplastic fibers, then heating the fibers to form nodulated fiber remnants.

The problem with these current methods is that they either require thermally-bonded non-woven materials, or abrasive particles in addition to a polymeric binder. These processes require additional manufacturing time and expense. There is a need for an abrasive nonwoven, where the abrasive surface is formed by surface application of a polymer composition, without added abrasive particles.

Surprisingly, it has now been found that an abrasive substrate may be formed by applying a polymer solution or dispersion by a non-homogeneous application of the polymer to a substrate, and processing the polymer coated substrate under conditions to produce an abrasive surface.

SUMMARY OF THE INVENTION

It is an object of the present invention to form an abrasive surface on a substrate solely by application of a polymer composition to the surface.

It is a further object of the invention to produce a nonwoven substrate that can function as both a wet and a dry abrasive.

The present invention is directed to an abrasive substrate comprising a substrate having directly deposited on at least one surface, in a non-homogeneous manner, a cured polymer composition, wherein said polymer composition has an MFFT of greater than −10° C. and said polymer composition comprises one or more polymers having a Tg or greater than 0° C., wherein the cured polymer composition on the substrate surface is abrasive, and wherein say abrasive substrate is free of abrasive particles.

The invention is also directed a process for producing an abrasive substrate comprising:
   a) applying a polymer composition in the form of a solution or dispersion to a substrate in a non-homogeneous manner;
   b) curing said polymer composition in a manner to form a non-homogeneous polymer surface on the substrate, producing an abrasive surface.

DETAILED DESCRIPTION OF THE INVENTION

The present invention is directed to an abrasive substrate, having a cured polymer composition in a non-homogeneous arrangement on the substrate surface, producing an abrasive surface without the need for embedded abrasive particles.

By "abrasive" as used herein is meant that the substrate having a heterogeneous polymer surface is able to roughen or wear away another surface. The abrasive substrates of the present invention are generally mild abrasives useful on skin, or to remove materials stuck onto hard surfaces, without damaging said surface. The abrasiveness of the substrate is due to the cured polymer composition, and not to any added solid abrasive materials such as mineral particles, curly fibers, or other solid additives.

The abrasive substrate of the invention is formed by properly selecting and combining:
   a) a specified polymer composition,
   b) a specific means of applying the polymer composition to a substrate in a non-homogeneous manner, and
   c) a means of processing the polymer coated substrate to produce an abrasive surface.

The polymer composition useful in the present invention is one having a minimum film-forming temperature (MFFT) above −10° C., and in most room temperature applications an MFFT above 15° C. The polymer composition useful in the present invention is in the form of a liquid solution or dispersion. Preferably the polymer composition is an aqueous solution or dispersion, and most preferably it is in the form of a polymer emulsion. The polymer composition is a combination of a solvent (water, organic solvent or a mixture thereof), a polymer and optional adjuvants. It is known in the art that the MFFT of a polymer composition can be raised or lowered from the Tg of the polymer by the addition of certain adjuvants, such as plasticizers, coalescents, surfactants, and other additives The polymer composition must be hard enough at the end-use temperature to serve as an abrasive. The Tg of the polymer composition will preferably be above 0° C., and in most room temperature applications is preferably above 15° C. The MFFT of the polymer composition should be below the processing temperature in order to allow for bonding to the substrate. In most applications of the present technology, the MFFT of the polymer composition will be below 105° C.

The polymer useful in the polymer composition may be of any chemistry and architecture. It may be a homopolymer, copolymer, or terpolymer, and may be a blend of two or more different polymers. The polymers may be random, block, star or other known architecture. They may be made by known means, such as emulsion polymerization, dispersion, suspension or solution polymerization. In a preferred embodiment the polymer is formed by emulsion polymerization. The polymers may be non-functional, or may contain functionality designed to optimize the properties of the coating in the specific application. One of skill in the art will be able to adjust monomer content and architecture to improve end-use performance of the polymer composition. The polymer could be a synthetic polymer, or could be a natural polymer such as, for example, a polysaccharide, starch, modified starch, or guar gum. Preferred polymers include homopolymers and copolymers having one or more of the following monomers: (meth) acrylates, maleates, (meth)acrylamides, vinyl esters, itaconates, styrenics, unsaturated hydrocarbons and acrylonitrile, nitrogen functional monomers, vinyl esters, alcohol functional monomers. Particularly preferred monomers include, but are not limited to, vinyl acetate; methyl (meth)acrylate, ethyl (meth)acrylate, butyl (meth)acrylate, ethylene, vinyl chloride, and styrene.

Polymer compositions having similar MFFTs may impart different abrasive properties under dry conditions than under wet conditions. Some of the considerations that must be considered in choosing a polymer for use in the polymer composition include water solubility, solvent computability, abrasive duration, level of abrasiveness, level of formaldehyde acceptable in the application, governmental regulations, and other conditions varying with the many possible end-use applications in which an abrasive substrate may be useful.

In one embodiment, the polymer in the composition is a cross-linkable polymer. By "cross-linkable" as used herein is meant a polymer that is capable of undergoing crosslinking, either by a self-crosslinking mechanism, or by the incorporation of at least one functional monomer into the polymer backbone which can undergo a post-polymerization crosslinking reaction to form crosslinks. The crosslinking monomers used herein include N-methylol acrylamide, N-methylol methacrylamide, N-methylol allyl carbamate, iso-butoxy methyl acrylamide and n-butoxy methyl acrylamide, or a mixture thereof. The preferred crosslinking monomers are N-methylol acrylamide as well as a blend of N-methylol acrylamide and acrylamide. The crosslinking monomer is generally used at levels above 3 percent, preferably from 6.5 to 20 percent, and more preferably from 7 to 12 percent based upon the weight of the polymer.

Crosslinking is preferred in those applications requiring a level of durability, such as for use in water or other solvents, for wet wipes, for multiple-use applications, and for harsh use applications. The preferred method of crosslinking is self-crosslinking with NMA. Functional polymers with external crosslinkers, such as melamine formaldehydes, may also be effective.

The polymer may be blended with one or more adjuvants to form the polymer composition. Useful adjuvants include, but are not limited to plasticizers; cross-linkers; starch; polyvinyl alcohol; formaldehyde thermosetting agents such as melamine, urea, phenol; fillers; humectants; surfactants; salts; fragrances; pigments; natural abrasives such as walnut flour; and encapsulated components. Especially useful are adjuvants designed to keep the polymer on the surface of the substrate, such as starch, polyvinyl alcohol, thickening agents, rheology modifiers, stearates, surfactants, and coalescents. The adjuvants are generally present in the polymer composition at from 0 to 20 percent by weight, and preferably from 5 to 15 percent by weight, based on the polymer solids. Preferably the polymer composition contains no abrasive particles.

The polymer composition is applied to the surface of a substrate in a manner designed to optimize the desired abrasive quality. The polymer composition is applied as a solution or dispersion, as opposed to hot melts and other liquid plastics. The polymer composition may be applied to one or both sides of the substrate. The application of the polymer composition should create an irregular, non-homogeneous surface on the substrate. Examples of application methods useful in the invention include, but are not limited to, spray, foam, and print application. Application by saturation and other methods producing a uniform surface would not be used in the present invention.

It has been found that the use of the high MFFT polymers of the present invention will impart stiffness to a fibrous substrate, which can lead to stiff, irregular fibers, and may result in an abrasive quality. This stiffening of the fibers to produce an abrasive quality is different from the present invention in which abrasive quality is due to the polymer composition being applied to the surface of a substrate in a heterogeneous fashion and cured—resulting in an irregular, abrasive surface.

Application processes, such as saturation are also not very useful in the current application since most of the polymer composition is inside the substrate, rather than on the surface. The polymer is applied as a surface treatment, and is not intended to penetrate significantly into the substrate, as polymer penetration could adversely effect other substrate properties. It is a unique property of the polymer compositions of the present invention that they stay primarily on the surface until cured. The polymer composition of the invention has the ability to remain primarily on the surface until cured. The ability of the polymer composition to remain on the surface until cured includes application on porous and hydrophilic substrates, which is generally difficult to achieve. While a small amount of the polymer composition may penetrate into the substrate, it is desirable to minimize this amount. Polymer that penetrates into the substrate can produce a change in the flexibility of the substrate, which may be undesirable. Preferably, less than 20 percent by weight of the polymer composition will penetrate more than 20 percent into the substrate.

When applying the polymer composition, water or other solvents can be added to dilute the composition to a solids level compatible with the application process. For spray applications, whether air or airless spray, the solids level of the polymer composition will generally be in the range of 10 to 70 percent, and preferably in the range of 25 to 45 percent. For foam applications a polymer composition solids level of 10 to 60 percent is generally used, and preferably 25 to 45 percent. Print application generally uses a polymer composition solids of from 10 to 70 percent, and preferably from 30 to 50 percent solids.

By "non-homogeneous" as used herein is meant that the surface of the polymer composition will be uneven, having high and low points. It is the polymer composition along with the unevenness of the surface that results in the abrasive feeling of the substrate following processing. The coating on the substrate may be continuous or non-continuous, depending on the method of application. When the polymer composition is applied by a print or spray application, it is possible that some of the substrate will have no polymer coated on it, and remain exposed on the environment. In the case of foam application, the surface will be coated in a continuous manner, yet the surface will be uneven, and appear rough. When the polymer composition is applied by foaming, it is important that the foam collapse prior to being cured. To hasten the collapse of the foam, the polymer composition preferably contains no foam stabilizers.

The add-on range of the polymer composition is generally at greater than 20 percent for nonwovens and other porous substrates, and preferably from in the range of from 30 to 50 percent. The add-on range for nonporous substrates, such as films and plastics is generally above 10 percent, and preferably in the range of from 15 to 30 percent.

Substrates to which the polymer composition may be applied to produce an abrasive substrate include, for example, non-wovens, fabric and other woven materials, paper and paper board, leather, wood, plastics and polymeric films. Examples of non-wovens include airlaid pulp, spunbond nonwovens, melt blown nonwovens, hydroentangled nonwovens, thermally-bonded nonwovens, and chemically-bonded nonwovens. One preferred embodiment is the application of the high Tg polymer composition as a coating on an air-laid non-woven web Processing of the polymer-coated substrate is important to achieve an abrasive surface in the final product. In general, the polymer composition should be cured quickly to preserve the uneven quality which creates abrasiveness. Curing can occur by heating the substrate, by UV or IR radiation, by gamma radiation, controlled Radio Frequency, or using acid or base catalysts. The length of time between the application of the polymer composition and curing can depend upon the specific polymer composition. It has been found that with lower MFFT polymers the time before cure could be as high as one hour and still produce a good abrasive surface. For higher MFFT polymer compositions, curing within five minutes after application produced good abrasiveness. Curing temperatures in excess of 250°F. are preferred to both preserve the non-homogeneous surface, and also to prevent penetration of the polymer composition into the substrate. Substrates treated with the polymer are useful in a wide variety of applications, including, but not limited to, hard surface scrubbers, cosmetic wipes, wipes to remove make-up, sanding papers, antiseptic scrubs, wound cleaners, personal cleansing, household cleaning, industrial scrubbing, exfoliating wipes, and stain removing wipes.

The polymer composition of the present invention can also be applied to substrates containing abrasive particle, including curly fibers and other solid particles and fibers, as the polymer will serve to stiffen the fibers, making them more abrasive.

In one embodiment an abrasive non-woven of the invention is useful as both a wet and a dry abrasive. This combination of wet and dry abrasiveness in a non-woven has been difficult to obtain by current means.

The following examples are presented to further illustrate and explain the present invention and should not be taken as limiting in any regard.

EXAMPLE 1

The following polymer compositions were diluted with water to 30 percent solids and foamed on a Hobart mixer for 60 seconds using high speed (#3) with a wire whip blade. The polymer was then foam coated to 0.25 inch thickness onto resin-bonded airlaid pulp. The coated substrates were then dried and cured at 130° C. for five minutes. After cooling to ambient temperature, the Abrasive Quality was measure subjectively by rubbing it with fingers and hand. The results of the abrasive quality testing are found in Table 1.

Sample A: (comparative) An emulsion polymer of butyl acrylate, acrylonitrile, 3.0 pph n-methyol acrylamide (NMA), having a Tg of −42° C.

Sample B: (Comparative) An emulsion polymer of ethylene (E), vinyl acetate (VAc), and 8.3 NMA-LF NMA, having a Tg of +5° C.

Sample C: An emulsion polymer of methyl methacrylate (MMA), ethyl acrylate (EA) and 2.4 NMA, having a Tg of +10° C., and an MFFT of −0.07° C.

Sample D: An emulsion polymer of MMA, EA and 2.4 NMA, having a Tg of +25° C., and an MFFT of 18.0° C.

Sample E: An emulsion polymer of MMA, butyl acrylate (BA) and 2.4 NMA, having a Tg of +56° C., and an MFFT of 50.0° C.

Sample F: An emulsion polymer of MMA, BA, and 2.4 NMA having a Tg of +78° C.

Sample G: An emulsion polymer of butyl methacrylate (BMA), and 2.4 NMA having a Tg of +20° C.

Sample H: An emulsion polymer of styrene (STY), BMA, and 2.4 NMA having a Tg of +36° C.

Sample I: An emulsion polymer of STY, BA, and 6.5 percent NMA having a Tg of +50° C.

Sample J: An emulsion polymer of E, VAc, vinyl chloride (VCI), and 6.5 percent NMA having a Tg of +30° C.

Sample K: A polyurethane dispersion having a hardness level of 6,100.

Sample L: An emulsion polymer of VA and NMA having a Tg of +29° C.

In the Table, "Firm" indicates that the surface felt more smooth than rough (smooth tends to indicate a more complete film across the surface, resulting in a firm fabric feel). "Rough" indicates that the surface was irregular. "Very Rough" indicates higher irregularity.

TABLE I

| SAMPLE | Tg, ° C. | MFFT, ° C. | ABRASIVE QUALITY |
| --- | --- | --- | --- |
| A | −42 | — | Soft and Tacky |
| B | +5 | — | Firm, No Abrasion |
| C | +10 | 0.07 | Firm, Moderate Abrasion |
| D | +25 | 18.0 | Rough, Good Abrasion |
| E | +56 | 50.0 | Rough, Light Abrasion |
| F | +78 | — | Rough, Light Abrasion |
| G | +20 | — | Very Rough, High Abrasion |
| H | +36 | — | Very Rough, High Abrasion |
| I | +50 | — | Rough, Light Abrasion |
| J | +30 | — | Rough, Good Abrasion |
| K | | — | Very Rough, High Abrasion |
| L | +29 | — | Rough, Good Abrasion |

EXAMPLE 2

Effect of Method of Application and Curing

Sample D was diluted to 12 percent solids to reduce binder add-on, and coated onto resin-bonded airlaid pulp by the following methods:

a) By foaming and immediate curing at 130° C. for 5 minutes, the same as in Example 1.

b) By foaming, as in Example 2a, with a 1 hour air dry time prior to curing.

c) By foaming followed y the application of a vacuum to pull the polymer composition into the non-woven web, followed immediately by curing at 130° C. for 5 minutes.

d) By dip-squeeze saturation in which the non-woven fabric was submersed in the polymer composition, then squeezed to remove excess polymer composition, followed immediately by curing at 130° C. for 5 minutes.

TABLE 2

| Application | Vacuum | Drying | Abrasive Quality |
|---|---|---|---|
| 2a Foam | No | 5' 169 130° C. | Moderate Abrasive |
| 2b Foam | No | Air Dry; 5' 169 130° C. | Moderate Abrasive |
| 2c Foam | Yes | 5' 169 130° C. | Firm; Low Abrasive |
| 2d Dip Squeeze | No | 5' 169 130° C. | Firm; Very Low Abrasive |

The results show the importance of a surface treatment that is cured on the surface, for the production of abrasive qualities.

EXAMPLE 3

The applications and curing of Example 2 were repeated using polymer composition H in place of polymer composition D.

TABLE 3

| Application | Vacuum | Drying | Abrasive Quality |
|---|---|---|---|
| 3a Foam | No | 5' 169 130° C. | Moderate Abrasive |
| 3b Foam | No | Air Dry; 5' 169 130° C. | Low-Moderate Abrasive |
| 3c Foam | Yes | 5' 169 130° C. | Firm; Low Abrasive |
| 3d Dip Squeeze | No | 5' 169 130° C. | Firm, Very Low Abrasive |

EXAMPLE 4

Sample D was diluted to different levels and foam applied as in Example 1. The following results were generated, showing the relationship between abrasiveness and add-on.

TABLE 4

| Example | Add-on, % | Abrasive Quality |
|---|---|---|
| 4a | 35 | Rough, good abrasion |
| 4b | 26 | Moderate abrasion |
| 4c | 21 | Moderate abrasion |

What is claimed is:

1. An abrasive substrate comprising a substrate having directly deposited on at least one surface, in a non-homogeneous manner, a cured polymer composition, wherein said polymer composition has an MFFT of greater than −10° C. and said polymer composition comprises one or more polymers having a Tg or greater than 0° C., wherein the cured polymer composition on the substrate surface is abrasive, and wherein said abrasive substrate is free of abrasive particles.

2. The abrasive substrate of claim 1 wherein the Tg of said one or more polymers in the polymer composition is from 20° C. to 105° C.

3. The abrasive substrate of claim 1 wherein said polymer composition further comprises one or more adjuvants selected from the group consisting of plasticizers, cross-linkers, starch, polyvinyl alcohol, formaldehyde thermosetting agents, melamine, urea, phenol, tackifiers, fillers, humectants, surfactants, salts, fragrances, pigments, natural abrasives, walnut flour, and encapsulated components.

4. The abrasive substrate of claim 1 wherein said substrate is selected from the group consisting of non-wovens, fabric, woven materials, paper, paper board, leather, wood, plastics, and polymeric films.

5. The abrasive substrate of claim 1 wherein said polymer composition comprises a crosslinkable polymer.

6. The abrasive substrate of claim 5 wherein said crosslinkable polymer comprises from 3 to 20 percent by weight of one or more crosslinking monomer units.

7. The abrasive substrate wherein less than 20 percent by weight of the polymer coating penetrates more than 20 percent into the substrate.

8. The abrasive substrate of claim 1, wherein said polymer composition is a solution or dispersion.

9. The abrasive substrate of claim 8 wherein said solution or dispersion is an aqueous solution or dispersion.

10. The abrasive substrate of claim 9 wherein said polymer comprises an emulsion polymer.

11. A process for producing the abrasive substrate according to claim 1 comprising:

a) applying a polymer composition in the form of a solution or dispersion to a substrate in a non-homogeneous manner;

b) curing said polymer composition in a manner to form a non-homogeneous polymer surface on the substrate, thereby producing an abrasive surface.

12. The process of claim 11 wherein said polymer composition is applied to the substrate by spraying, foaming or printing.

13. The process of claim 11 wherein said polymer composition is cured within 1 hour of application to the substrate.

14. The process of claim 13 wherein said polymer composition is cured within 5 minutes of application to the substrate.

* * * * *